United States Patent
Nagata et al.

(10) Patent No.: US 9,498,750 B2
(45) Date of Patent: Nov. 22, 2016

(54) EXHAUST TREATMENT DEVICE

(71) Applicant: FUTABA INDUSTRIAL CO., LTD., Aichi (JP)

(72) Inventors: Yoshinobu Nagata, Aichi (JP); Tatsutoshi Osaki, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 138 days.

(21) Appl. No.: 14/369,083

(22) PCT Filed: Dec. 25, 2012

(86) PCT No.: PCT/JP2012/083486
§ 371 (c)(1),
(2) Date: Jun. 26, 2014

(87) PCT Pub. No.: WO2013/099872
PCT Pub. Date: Jul. 4, 2013

(65) Prior Publication Data
US 2014/0348715 A1 Nov. 27, 2014

(30) Foreign Application Priority Data
Dec. 26, 2011 (JP) .................... 2011-283997

(51) Int. Cl.
*B01D 50/00* (2006.01)
*B01D 53/92* (2006.01)
(Continued)

(52) U.S. Cl.
CPC ............. *B01D 53/92* (2013.01); *F01N 3/0335* (2013.01); *F01N 3/2885* (2013.01); *F01N 13/1838* (2013.01); *F01N 2450/22* (2013.01); *F01N 2470/18* (2013.01); *F01N 2470/20* (2013.01); *Y02T 10/20* (2013.01)

(58) Field of Classification Search
CPC .......... B60K 2015/0346; B01D 53/92; F01N 3/2885; F01N 2470/18
USPC .................... 422/168; 181/227, 228
See application file for complete search history.

(56) References Cited

U.S. PATENT DOCUMENTS

2003/0051449 A1* 3/2003 Nishiyama ............ F01N 3/0814
55/309

FOREIGN PATENT DOCUMENTS

| JP | 09303133 A | 11/1997 |
| JP | 2005146852 A | 6/2005 |

(Continued)

OTHER PUBLICATIONS

International Search Report and Written Opinion in English dated Mar. 12, 2013 for corresponding International Patent Application No. PCT/JP2012/083486, filed Dec. 25, 2012.

(Continued)

*Primary Examiner* — Tom P Duong
(74) *Attorney, Agent, or Firm* — David D. Brush; Westman Champlin & Koehler, P.A.

(57) ABSTRACT

Provided is an exhaust treatment device including a cylindrical shell into which an exhaust gas is introduced, and a flow channel pipe that penetrates through the cylindrical shell. One end of the flow channel pipe is connected to an exhaust-gas flow path of an internal combustion engine, and the exhaust gas is introduced into the cylindrical shell via the flow channel pipe. A pair of through holes, in which the flow channel pipe is disposed, are provided in a pipe wall of the cylindrical shell. A lid member configured to occlude one of the through holes is welded to the other end of the flow channel pipe so as to occlude an opening in the other end. The lid member is welded to the pipe wall so that the one of the pair of through holes is occluded by the lid member.

4 Claims, 5 Drawing Sheets

(51) Int. Cl.
  *F01N 3/28* (2006.01)
  *F01N 3/033* (2006.01)
  *F01N 13/18* (2010.01)

(56) References Cited

FOREIGN PATENT DOCUMENTS

| JP | 2005330839 A | 12/2005 |
| JP | 2010007526 A | 1/2010 |

OTHER PUBLICATIONS

International Preliminary Report on Patentability and Written Opinion dated Jul. 1, 2014 for the corresponding International Application No. PCT/JP2012/083486, filed Dec. 25, 2012.
Extended European Search Report dated Sep. 8, 2015 for corresponding European Application No. 12862552.2.
Office Action in the counterpart Chinese Application No. 2012/80064001.1 dated Oct. 30, 2015 and its English Translation.

* cited by examiner

II – II

EXHAUST TREATMENT DEVICE

CROSS-REFERENCE TO RELATED APPLICATIONS

This Application is a Section 371 National Stage Application of International Application No. PCT/JP2012/083486, filed Dec. 25, 2012, which is incorporated by reference in its entirety and published as WO 2013/099872 on Jul. 4, 2013, not in English, which claims the benefit of Japanese Patent Application No. 2011-283997, filed Dec. 26, 2011 in the Japan Patent Office, and the entire disclosure of Japanese Patent Application No. 2011-283997 is incorporated herein by reference.

TECHNICAL FIELD

The present invention relates to an exhaust treatment device that performs purification of an exhaust gas from an internal combustion engine, reduction of exhaust noise, or the like.

BACKGROUND ART

There are known an exhaust gas purifying device, which is interposed in an exhaust-gas flow path of an internal combustion engine in a gasoline engine, a diesel engine and the like, to purify an exhaust gas by a catalyst or the like, and an exhaust silencing device by which an exhaust noise is reduced. As such type of device, there is known a device in which a flow channel pipe is inserted into a cylindrical shell from a radial direction thereof and is connected to an exhaust-gas flow path, thereby generating a flow channel through which an exhaust gas flows, as described in Japanese Unexamined Patent Application Publication No. 2005-330839.

SUMMARY OF THE INVENTION

The present invention is an exhaust treatment device that treats an exhaust gas from an internal combustion engine. The exhaust treatment device includes a cylindrical shell into which the exhaust gas is introduced, and a flow channel pipe inserted in such a manner as to penetrate through the cylindrical shell. One end of the flow channel pipe is connected to an exhaust-gas flow path of the internal combustion engine, and the exhaust gas flowing through the exhaust-gas flow path is introduced into the cylindrical shell via the flow channel pipe. A pair of through holes, in which the flow channel pipe is disposed, are provided in a pipe wall of the cylindrical shell. A lid member configured to occlude one of the through holes is welded to the other end of the flow channel pipe so as to occlude an opening in the other end of the flow channel pipe. The lid member is welded to the pipe wall of the cylindrical shell so that the one of the through holes is occluded by the lid member.

In the exhaust treatment device of the present invention, the lid member may include a concave portion that receives the other end of the flow channel pipe. Alternatively, the lid member may include a convex portion that is inserted into the opening in the other end of the flow channel pipe.

In the exhaust treatment device of the present invention, the flow channel pipe may be arranged in such a manner as to obliquely cross the cylindrical shell.

DETAILED DESCRIPTION OF ILLUSTRATIVE EMBODIMENTS

Explanation of Reference Numerals

1 . . . exhaust treatment device, 10 . . . cylindrical shell, 12, 14 . . . end plate, 16, 18 . . . flow channel pipe, 20, 34 . . . cylindrical portion, 22, 24, 36, 38 . . . through hole, 26, 44 . . . flange member, 28, 46 . . . small holes, 30, 40 . . . lid member, 32, 42 . . . convex portion Mode for Carrying out the Invention Hereinafter, an exhaust treatment device to which the present invention is applied will be described with reference to the drawings.

Figure 1:
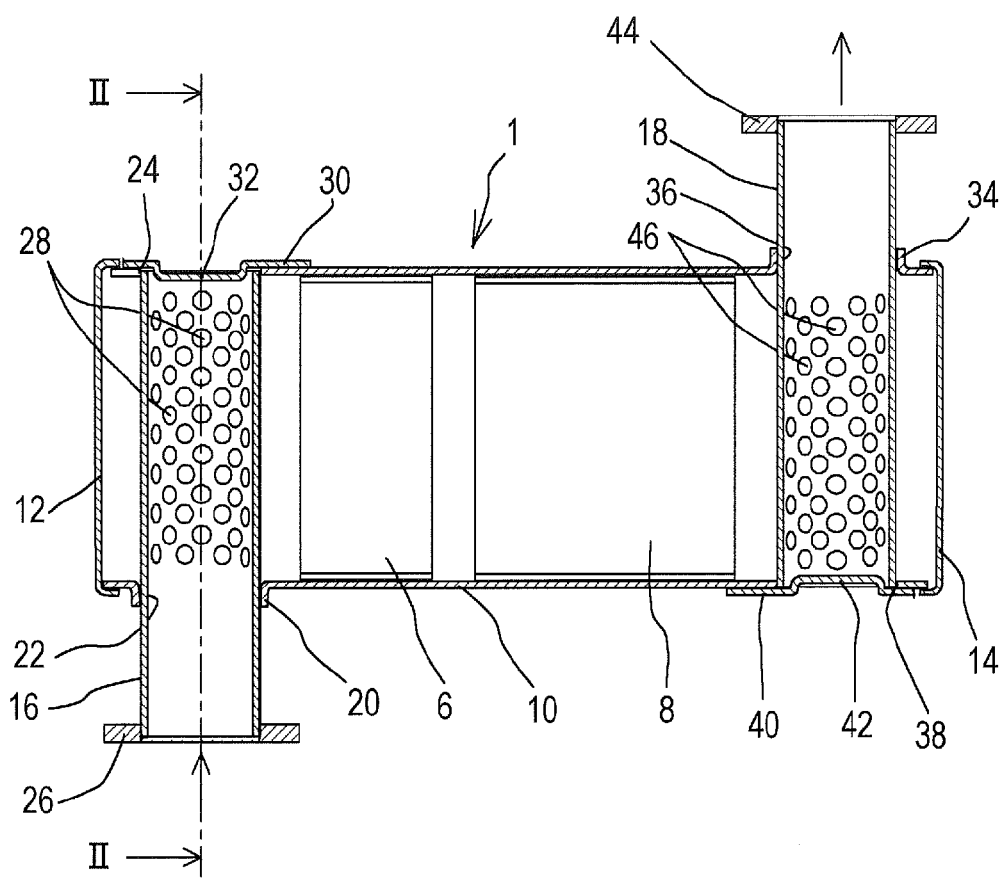
FIG. 1 is a cross-sectional view of an exhaust treatment device as an embodiment of the present invention.

An exhaust treatment device 1 according to the embodiment shown in FIG. 1 is interposed in an exhaust-gas flow path (exhaust-gas flow path of a vehicle) through which an exhaust gas flows from an internal combustion engine, which is not shown.

The exhaust treatment device 1 includes, as a configuration to achieve a purification of the exhaust gas, an oxidation catalyst 6 and a diesel particulate filter (hereinafter, referred to as DPF) 8. Further, the exhaust treatment device 1 includes a cylindrical shell 10 and flow channel pipes 16 and 18.

The oxidation catalyst 6 and the DPF 8 are housed in the cylindrical shell 10. Both ends of the cylindrical shell 10 are occluded by end plates 12 and 14.

The oxidation catalyst 6 changes hydrocarbon contained in the exhaust gas into carbon dioxide and water, and oxidizes and changes carbon monoxide into carbon dioxide. The oxidation catalyst 6 is a well-known oxidation catalyst that changes carbon monoxide in nitrogen oxide contained in the exhaust gas into carbon dioxide.

The DPF 8 is a well-known filter that traps and burns a particulate matter (PM) contained in the exhaust gas.

In the cylindrical shell 10, the flow channel pipe 16 is disposed between the end plate 12 and the oxidation catalyst 6, and the flow channel pipe 18 is disposed between the end plate 14 and the DPF 8. The flow channel pipe 16 is connected at a more upstream side of the exhaust-gas flow path, and the flow channel pipe 18 is connected at a more downstream side of the exhaust-gas flow path.

The flow channel pipe 16 is used to introduce the exhaust gas flowing through the exhaust-gas flow path into the exhaust treatment device 1 (into the cylindrical shell 10). A portion of the flow channel pipe 16, which portion is disposed inside of the cylindrical shell 10, has a number of small holes 28 drilled through the portion. The flow channel pipe 16 and an inside of the cylindrical shell 10 are connected to each other via the small holes 28.

The flow channel pipe 18 is used to introduce the exhaust gas purified through the exhaust treatment device 1 back to the exhaust-gas flow path. A portion of the flow channel pipe 18, which portion is disposed inside of the cylindrical shell 10, has a number of small holes 46 drilled through the portion. The flow channel pipe 18 and the inside of the cylindrical shell 10 are connected to each other via the small holes 46.

According to the present embodiment, the exhaust gas from the exhaust-gas flow path flows into the exhaust treatment device 1 (into the cylindrical shell 10) via the flow channel pipe 16. Then, the exhaust gas flows out to a downstream side of the exhaust-gas flow path through the oxidation catalyst 6 and the DPF 8, and via the flow channel pipe 18.

Figure 2:
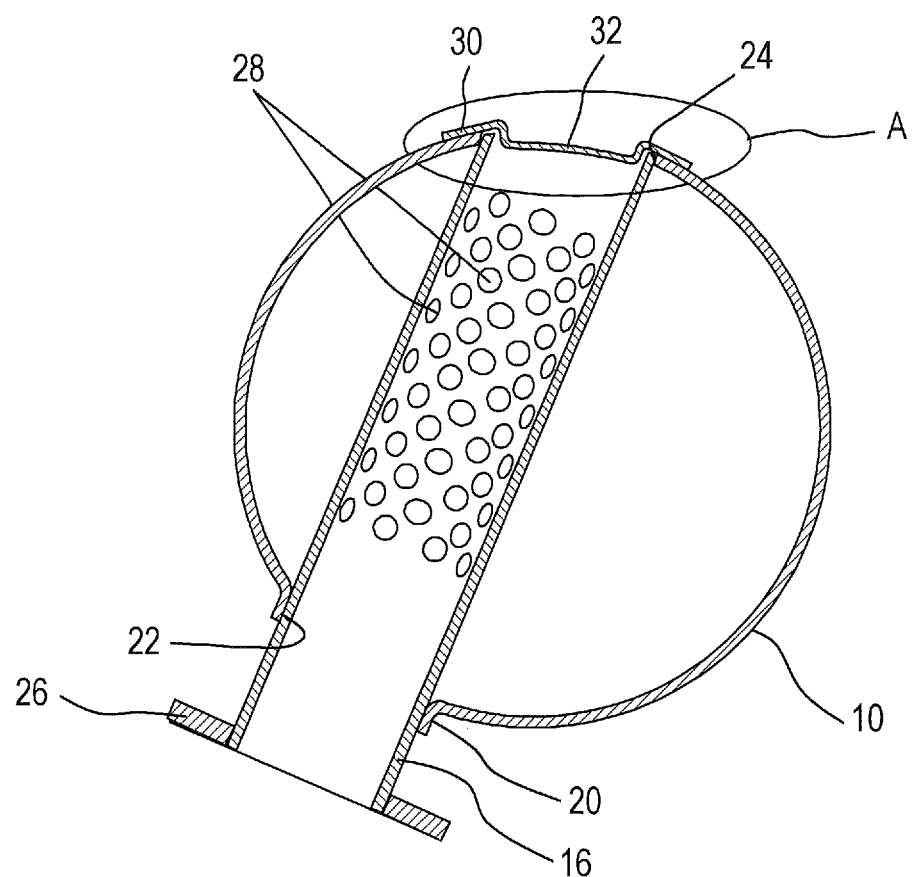
FIG. 2 is a cross-sectional view taken along a section line II-II shown in FIG. 1.

As shown in FIG. 2, the flow channel pipe 16 is inserted inside of the cylindrical shell 10 in such a manner as to penetrate through the cylindrical shell 10.

A through hole 22 is provided in the cylindrical shell 10. A cylindrical portion 20 formed by burring, for example, resides at the through hole 22. Burring is a process in which a rising edge is formed in a circumference of a hole.

In the cylindrical shell 10, a through hole 24 is provided on an opposed side of the through hole 22 in a corresponding manner to the through hole 22. The through holes 22 and 24 are provided as a pair so that the flow channel pipe 16 can be inserted through the through holes 22 and 24.

The through hole 22 is provided in order that the flow channel pipe 16 and the cylindrical portion 20 can be welded together in a state where the flow channel pipe 16 is inserted through the through hole 22.

According to the present embodiment, in a state where the flow channel pipe 16 is inserted through both of the pair of through holes 22 and 24, the flow channel pipe 16 is arranged in such a manner as to obliquely cross the cylindrical shell 10. In other words, as seen from FIG. 2, a central axis of the flow channel pipe 16 extending in a length direction thereof is deviated from a center of the cylindrical shell 10 shown in the cross-sectional view of FIG. 2 (the central axis of the flow channel pipe 16 extends without passing through the center of the cylindrical shell 10).

Correspondingly, the other end of the flow channel pipe 16 (i.e., an end positioned on an opposite side of where a flange member 26 is provided) is cut into a shape along an outer peripheral contour of the cylindrical shell 10 in order to suppress the other end of the flow channel pipe 16 from being projected outside of the cylindrical shell 10 through the through hole 24 in the state where the flow channel pipe 16 is inserted into the through holes 22 and 24. Therefore, a cutting surface of the other end of the flow channel pipe 16 is inclined with respect to the central axis of the flow channel pipe 16.

In the flow channel pipe 16, the flange member 26 is welded to an end of a portion projected to the outside of the cylindrical shell 10 through the through hole 22 (i.e., an end to which the exhaust-gas flow path is connected, which is hereinafter referred to as one end). The flow channel pipe 16 can be connected to the exhaust-gas flow path via the flange member 26.

Figure 3:
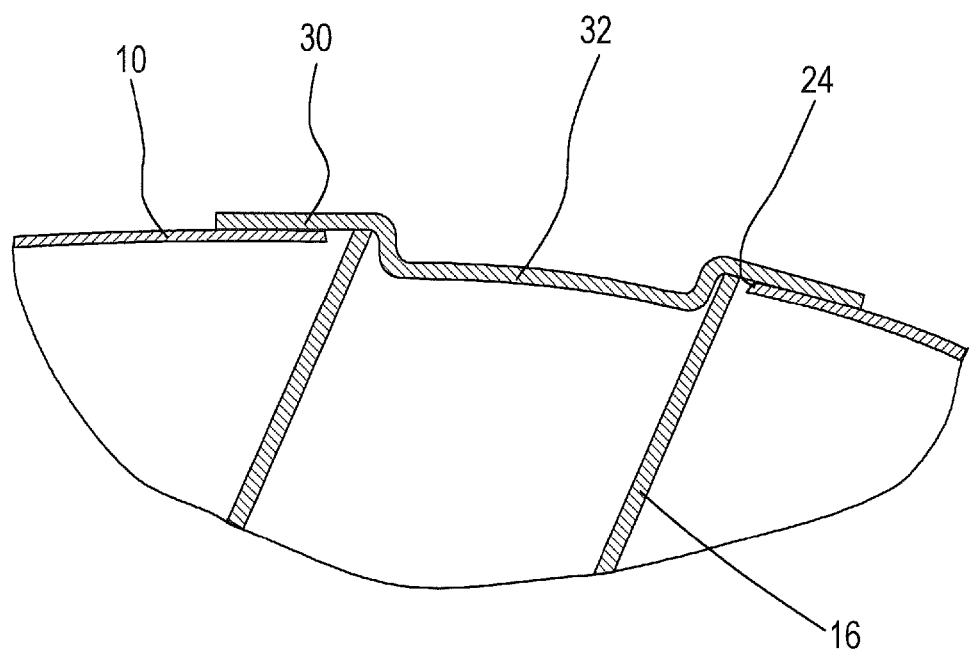
FIG. 3 is an enlarged view of a part A shown in FIG. 2.

The flow channel pipe 16 reaches the through hole 24. From among the both ends of the flow channel pipe 16, to one end positioned closer to the through hole 24 (i.e., to one end on the opposite side of where the flange member 26 is provided), a lid member 30 is attached. As shown in FIG. 3, an outside diameter of the lid member 30 is larger than a diameter of the through hole 24. Specifically, the lid member 30 is large enough to occlude the through hole 24 when the through hole 24 is covered by the lid member 30. Further, the lid member 30 is curved along the outer peripheral contour of the cylindrical shell 10 so as to be in close contact with a pipe wall of the cylindrical shell 10.

As shown in FIG. 3, the diameter of the through hole 24 is slightly larger than an outside diameter of the flow channel pipe 16. Meanwhile, a clearance between the flow channel pipe 16 and the through hole 24 (i.e., a clearance between the flow channel pipe 16 and the pipe wall of the cylindrical shell 10) can be occluded by the lid member 30 when the lid member 30 is disposed.

In the lid member 30, there is provided a convex portion 32 that protrudes toward inside of the cylindrical shell 10. A size (an outside diameter) of the convex portion 32 is determined such that the convex portion 32 can be inserted inside of the flow channel pipe 16 without interfering with a pipe wall of the flow channel pipe 16.

The convex portion 32 only has to have a height sufficient to position the lid member 30 and to suppress easy misalignment thereof, by insertion of the convex portion 32 into the flow channel pipe 16. For example, the height would be sufficient if the lid member 30 is inhibited from coming off of the flow channel pipe 16 at the time of welding the flow channel pipe 16 and the lid member 30 together.

In an assembly of the exhaust treatment device 1, first, the lid member 30 is positioned with respect to the flow channel pipe 16 while the convex portion 32 of the lid member 30 is inserted into the flow channel pipe 16. Next, the flow channel pipe 16 and the lid member 30 are welded from a side of the flow channel pipe 16, along a rim of an opening of the flow channel pipe 16. Then, the one end of the flow channel pipe 16 is inserted from the through hole 24 to the through hole 22. At this time, the flow channel pipe 16 is inserted into the cylindrical shell 10 until the one end of the flow channel pipe 16 is projected to the outside of the cylindrical shell 10 from the through hole 22.

The lid member 30 is appressed to the pipe wall of the cylindrical shell 10, and then the lid member 30 and the cylindrical shell 10 are welded together. In this way, the through hole 24 is occluded by the lid member 30.

Further, the flow channel pipe 16 is welded to the cylindrical portion 20 at the through hole 22.

The flow channel pipe 18 has a configuration similar to that of the flow channel pipe 16. The flow channel pipe 18 is interposed through a pair of through holes 36 and 38 provided in the cylindrical shell 10. To one of the both ends of the flow channel pipe 18, a flange member 44 is welded. A number of small holes 46 are provided in a portion of the flow channel pipe 18, which portion is housed inside of the cylindrical shell 10.

A cylindrical portion 34 formed by burring resides at the through hole 36.

A convex portion 42 is provided in a lid member 40 by which the through hole 38 is occluded. The convex portion 42 can be received by an opening of the flow channel pipe 18. In this way, the lid member 40 is easily positioned with respect to the flow channel pipe 18. Further, the position of the lid member 40 becomes less likely to be misaligned with respect to the flow channel pipe 18.

The lid member 40 is welded to the cylindrical shell 10 in a state where the lid member 40 is appressed to the pipe wall of the cylindrical shell 10.

According to the present embodiment the other ends of the flow channel pipes 16 and 18 are respectively occluded by the lid members 30 and 40, and the through holes 24 and 38 are also respectively occluded by the lid members 30 and 40. In this way, especially the other ends from among the both ends of the respective flow channel pipes 16 and 18 are not projected outside of the cylindrical shell 10. Therefore, an interference with peripheral components can be inhibited from occurring. Further, heat damage on the peripheral components can be inhibited, which damage may be caused by the other ends of the flow channel pipes 16 and 18 being projected to the outside of the cylindrical shell 10. The lid members 30 and 40 can occlude the other ends of the flow channel pipes 16 and 18, respectively, as well as the through holes 24 and 38, respectively, thereby the number of parts can be reduced.

The present invention should not be limited to the aforementioned embodiment, and can be implemented in various manners within a scope not departing from the spirit of the present invention.

Figure 5:
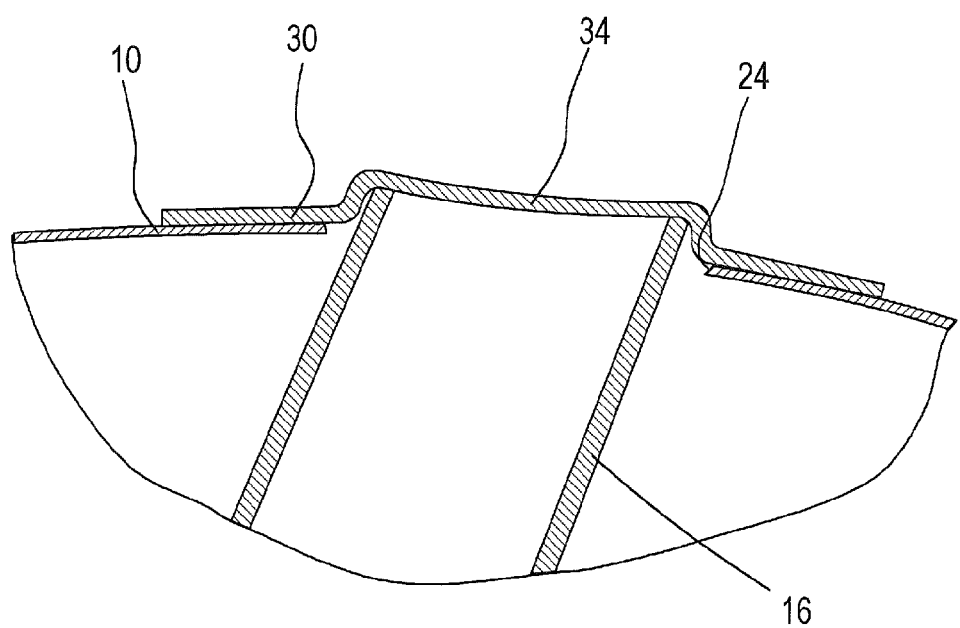
FIG. 5 is a view showing a concave portion of a lid member.

For example, the above-described embodiment has been explained with respect to an example in which the lid member 30 includes the convex portion 32. However, the lid member 30 can include, as a substitute for the convex portion 32, a concave portion 34, which is projected toward the outside of the cylindrical shell 10 and into which one end of the flow channel pipe 16 can be inserted (refer to FIG. 5). The concave portion 34 can be slightly projected toward the outside of the cylindrical shell 10. However, compared to a conventional manner, it is achievable to substantially reduce an amount of projection. Alternatively, it is not necessary for the lid member 30 to include the convex portion 32 or a concave portion as far as a clearance can be occluded by the lid member 30.

Further, the above-described embodiment has been explained with respect to an example in which the oxidation catalyst 6 and the DPF 8 are included. However, the present invention is applicable to an exhaust treatment device that includes either one of the oxidation catalyst 6 or the DPF 8, and is further applicable to an exhaust treatment device that includes an SCR catalyst together with, or as a substitute for, the oxidation catalyst 6 and the DPF 8. Further, the present invention is applicable not only to a purifying device such as the exhaust treatment device 1 but also to a silencing device.

According to the above-described embodiment, the flow channel pipe 16 positioned on a side where the exhaust gas flows in and the flow channel pipe 18 positioned on a side where the exhaust gas flows out are projected in opposite directions to each other with respect to the cylindrical shell 10. However, the present invention should not be limited to such embodiment, and may be configured such that the flow channel pipes 16 and 18 are projected to the same side with respect to the cylindrical shell 10.

Figure 4:
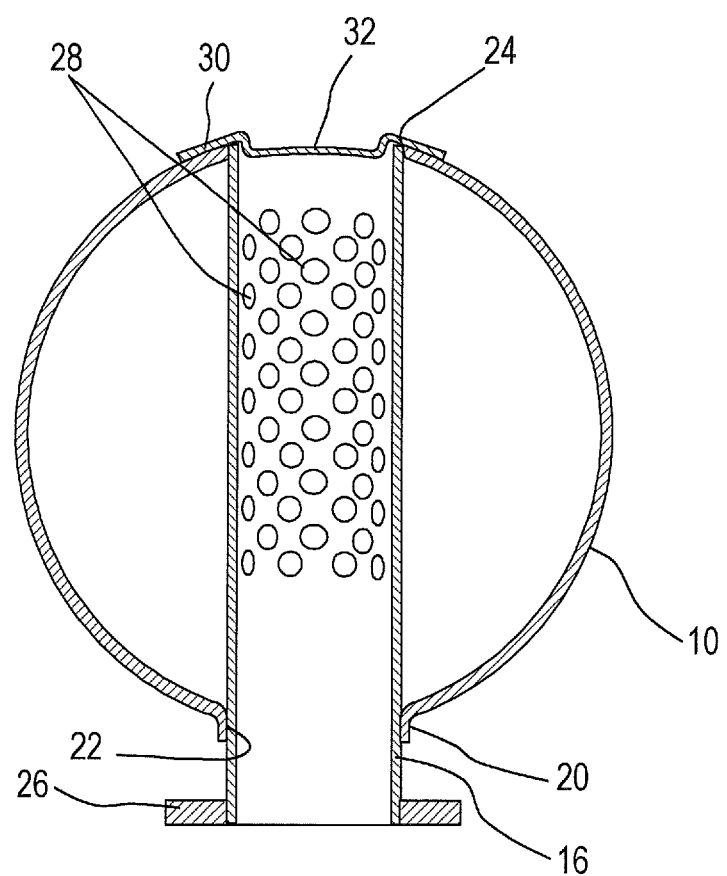
FIG. 4 is a cross-sectional view of an exhaust treatment device according to another embodiment showing a state in which the exhaust treatment device is cut at a flow channel pipe.

As shown in FIG. 4, the flow channel pipe 16 may be vertically (or horizontally) disposed so as to pass through the center of the cross-section of the cylindrical shell 10. Alternatively, while either or both of the flow channel pipes 16 and 18 are vertically (or horizontally) maintained, the either or both of the flow channel pipes 16 and 18 may be disposed at a decentered position with respect to the center of the cross-section of the cylindrical shell 10.

In the conventional device as described in the Background section, in a pipe wall of the cylindrical shell, there are provided a pair of through holes in which the flow channel pipe is disposed, and occluding members are provided, each having a cylindrical portion and a flange portion corresponding to each of the through holes. The occluding members are attached (welded) onto the pipe wall of the cylindrical shell. One end of the flow channel pipe is connected to the exhaust-gas flow path, and the other end of the flow channel pipe is occluded by a lid member while arranged in the cylindrical portion of the occluding member.

In such a conventional device, the cylindrical portions of the occluding members may be projected from the pipe wall of the cylindrical shell, and the other end of the flow channel pipe to which the lid member is attached may be unnecessarily projected from the pipe wall of the cylindrical shell. That is, both ends of the flow channel pipe may be projected from the cylindrical shell. Therefore, it has been pointed out that an interference with peripheral components or heat damage on the peripheral components may be caused.

In an exhaust treatment device, it is desirable to reduce an entire size of the exhaust treatment device by inhibiting members thereof from projecting unnecessarily.

The exhaust treatment device of an embodiment of the present invention is configured such that the other end of the flow channel pipe and the through hole are occluded by the lid member, and thereby such that the other end of the flow channel pipe is not projected to the outside of the cylindrical shell. Therefore, interference with peripheral components can be inhibited from occurring. Further, heat damage on the peripheral components caused by the flow channel pipe being projected to the outside of the cylindrical shell can be inhibited.

The invention claimed is:

1. An exhaust treatment device that treats an exhaust gas from an internal combustion engine, the exhaust treatment device comprising:
   a cylindrical shell into which the exhaust gas is introduced; and
   a flow channel pipe inserted in such a manner as to penetrate through the cylindrical shell,
   wherein the exhaust treatment device is configured such that one end of the flow channel pipe is connected to an exhaust-gas flow path of the internal combustion engine and the exhaust gas flowing through the exhaust-gas flow path is introduced into the cylindrical shell via the flow channel pipe,
   wherein a pair of through holes, in which the flow channel pipe is disposed, are provided in a pipe wall of the cylindrical shell, the pair of through holes having a larger diameter than an outer diameter of the flow channel pipe,
   wherein a lid member configured to occlude one of the through holes is welded to an other end of the flow channel pipe so as to occlude an opening in the other end of the flow channel pipe,
   wherein the lid member is welded to an outer surface of the pipe wall of the cylindrical shell so that the one of the through holes is occluded by the lid member, and
   wherein a clearance between one of the through holes and the flow channel pipe is occluded by the lid member.

2. The exhaust treatment device according to claim 1, wherein the lid member includes a concave portion that receives the other end of the flow channel pipe.

3. The exhaust treatment device according to claim 1, wherein the lid member includes a convex portion that is inserted into the opening in the other end of the flow channel pipe.

4. The exhaust treatment device according to claim 1, wherein the flow channel pipe is arranged in such a manner as to obliquely cross the cylindrical shell.

* * * * *